Jan. 23, 1962

A. P. BEALS 3,017,779

RECIPROCATING DRIVE MECHANISM

Filed July 10, 1957

Inventor,
Albert P. Beals.
by Parker & Carter,
Attorneys.

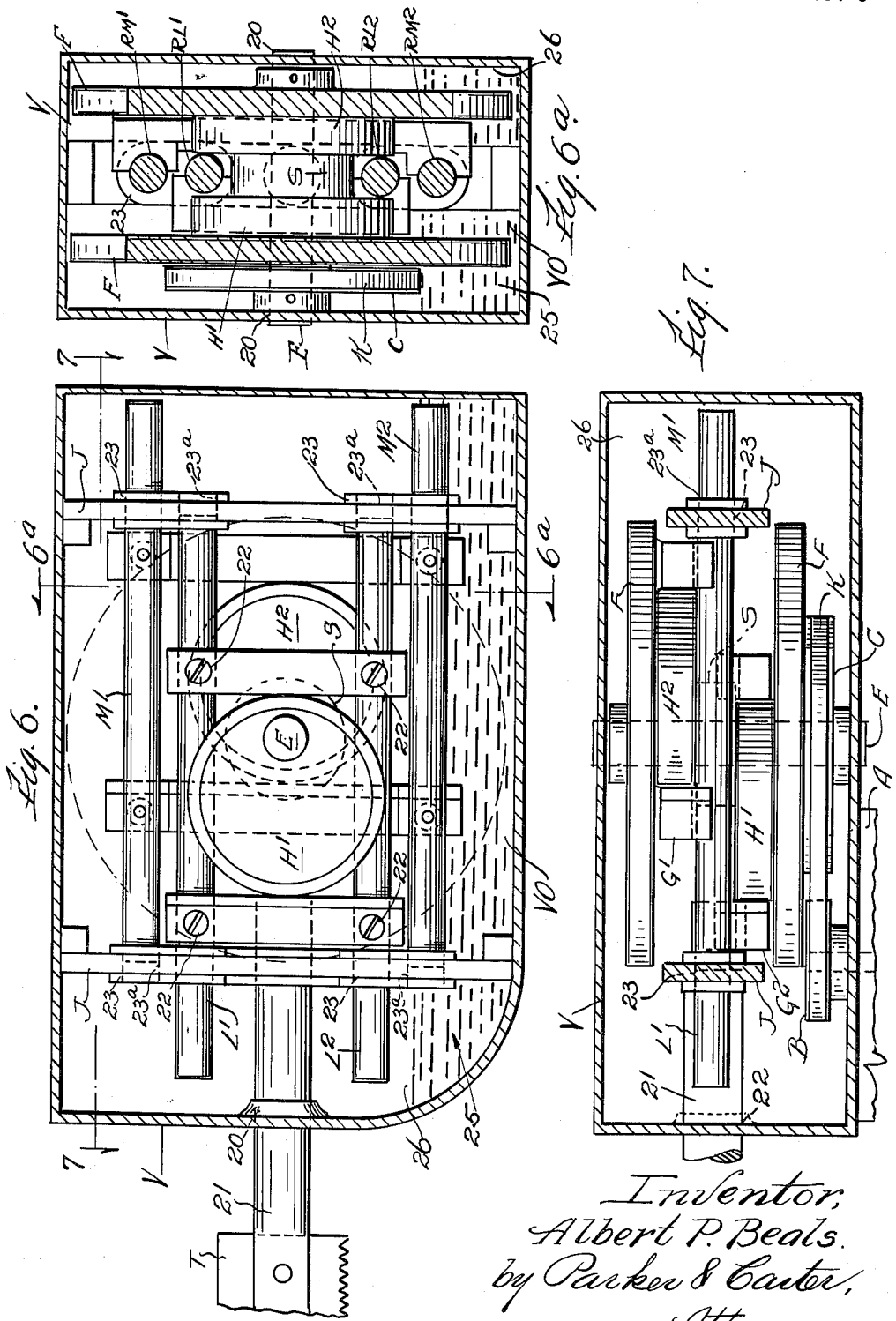

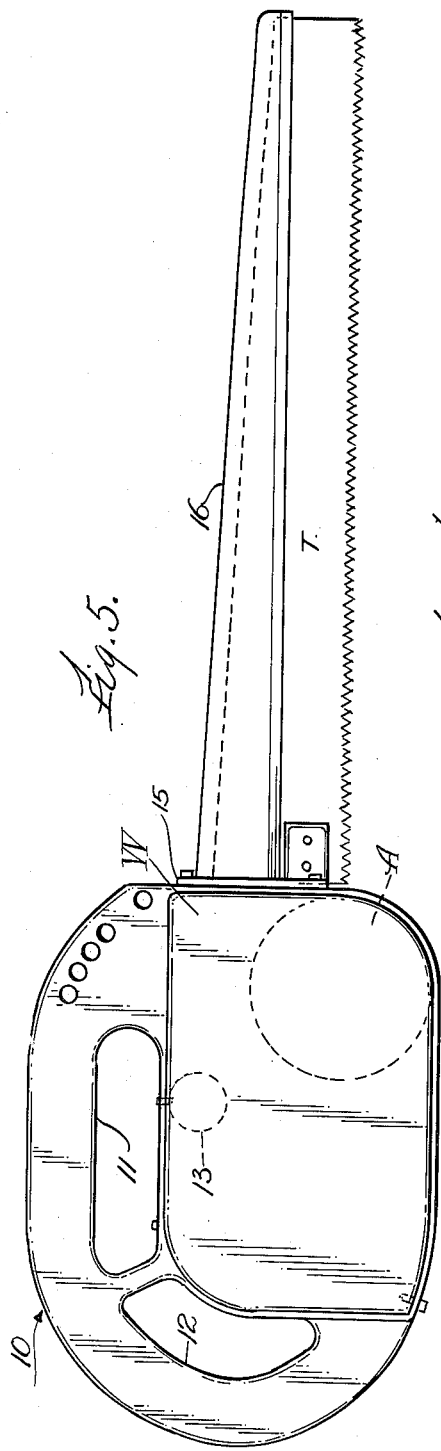
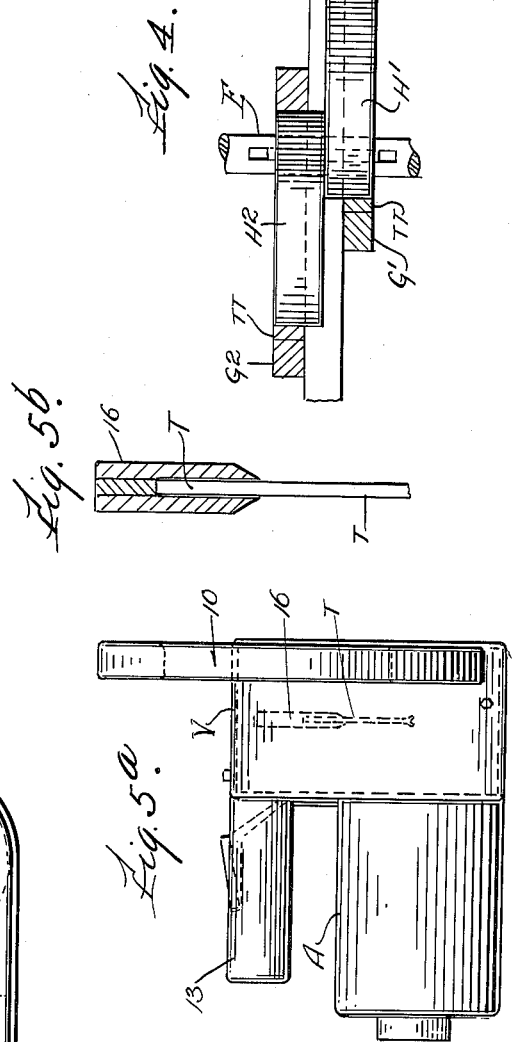

Jan. 23, 1962     A. P. BEALS     3,017,779
RECIPROCATING DRIVE MECHANISM
Filed July 10, 1957     5 Sheets-Sheet 5

Inventor.
Albert P. Beals.
by Parker & Carter,
Attorneys.

United States Patent Office 3,017,779
Patented Jan. 23, 1962

3,017,779
RECIPROCATING DRIVE MECHANISM
Albert P. Beals, Indianapolis, Ind.
(4428 Malden, Chicago 40, Ill.)
Filed July 10, 1957, Ser. No. 671,077
6 Claims. (Cl. 74—50)

This invention relates to reciprocating drives and has particular relation to a reciprocating drive useable with cutting members such as meat saws and the like.

One purpose of this invention is to provide a reciprocating drive which shall be of maximum simplicity and minimum weight.

Another purpose is to provide a reciprocating saw and a drive mechanism therefor which shall be productive of a minimum of vibration.

Another purpose is to provide a saw, reciprocating mechanism and sheath effective to produce a kerf of minimum width.

Another purpose is to provide a reciprocating drive in which the driven members and balancing members therefor lie generally in the same plane.

Another purpose is to produce a mechanism for converting rotary motion into reciprocating motion while avoiding to the maximum extent possible vibration and lateral motion.

Another purpose is to provide a portable reciprocating mechanism substantially free from vibration.

Another purpose is to provide a mechanism including a pair of horizontally aligned flywheels effective to produce a stabilizing effect and to reduce sideways motion and whip while producing momentum and smoothness of motion.

Reciprocating mechanisms are known wherein a pin and crank or pitman and crosshead have been employed. An undesirable amount of vibration and jump is produced by these devices. It is accordingly another purpose of my invention to employ driving cams and balance members having a direct, as opposed to an offset or off center, action upon a blade to provide the required power where it is needed. While important in many applications, the production of a lightweight portable saw assembly, in which the prevention of vibration and whip are paramount, is among the major purposes of my invention.

Other purposes will appear from time to time during the course of the specification and claims.

I illustrate my invention more or less diagrammatically in the accompanying drawings wherein FIGURE 1 is a side elevation illustrating the mechanism of my invention;

FIGURE 3 is a top view of the mechanism illustrated in FIGURE 1;

FIGURE 4 is a detail view of a portion of the mechanism illustrated in FIGURE 1;

FIGURE 5 is a side view of a saw employing my invention;

FIGURE 5a is a rear end view of the structure illustrated in FIGURE 5;

FIGURE 5b is a view illustrating the saw-guide sheath of my invention;

FIGURE 6 is a side view similar to that of FIGURE 1 and illustrating a variant form of my invention;

FIGURE 6a is a view taken on the line 6a—6a of FIGURE 6;

FIGURE 7 is a view taken on the line 7—7 of FIGURE 6;

Figure 1:
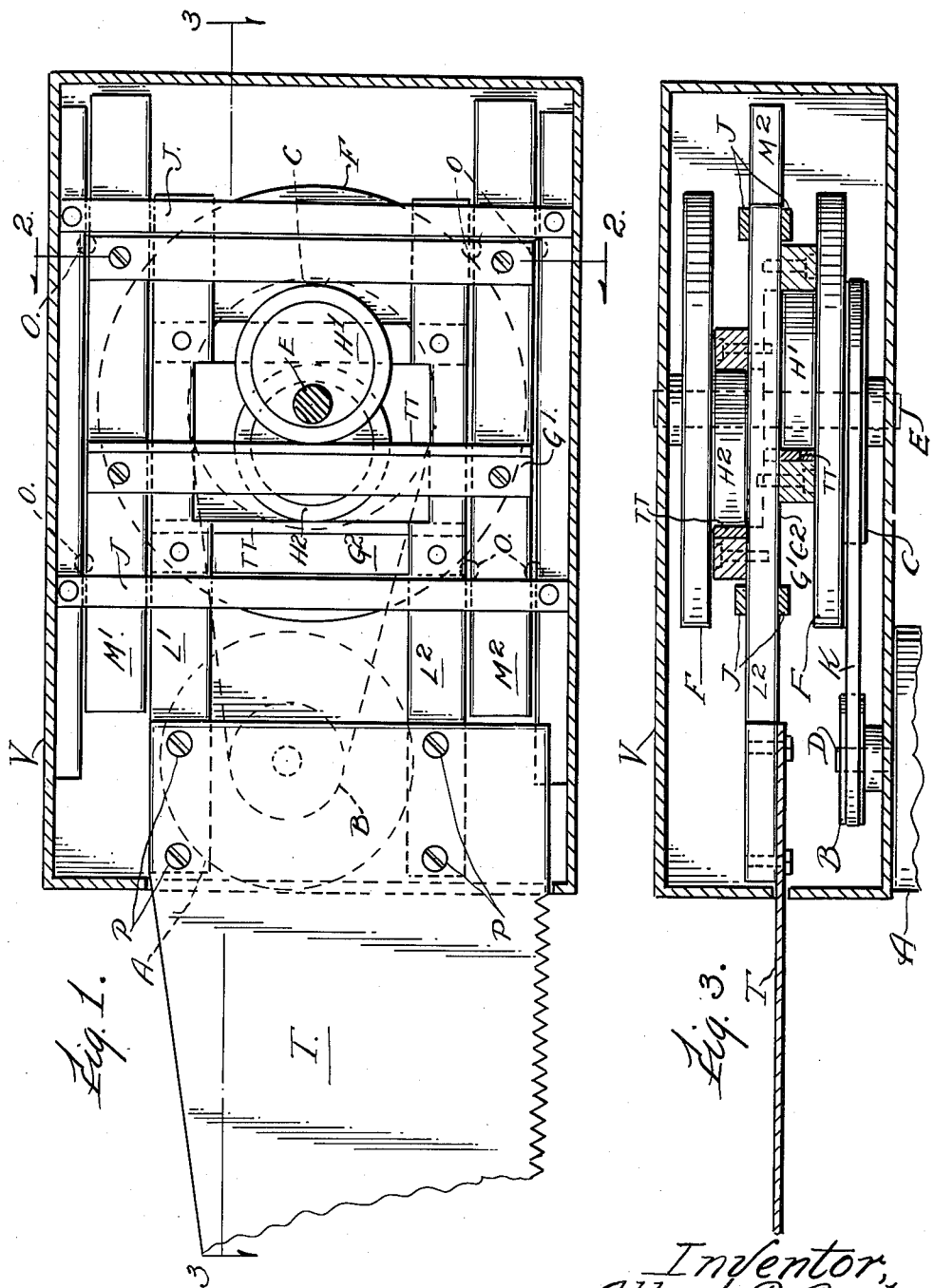
Figure 2:
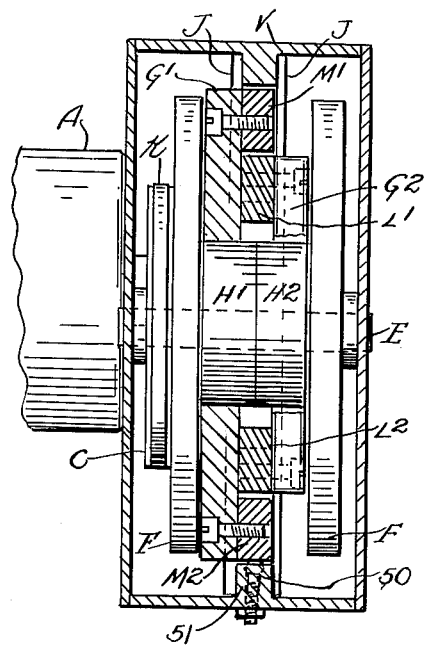
FIGURE 2 is an end view of the structure illustrated in FIGURE 1.

Like parts are indicated by like numerals throughout the specification and claims.

Referring now to the drawings and particularly to FIGURES 1–4 thereof, the letter A designates a suitable motor or power source. A driving pulley or sprocket B is driven by the motor A. The letter C designates a driven pulley fixed on a mechanism shaft E, the driving pulley B being similarly fixed on a motor shaft D. A motion-transmitting belt or chain, shown at K, is an endless member surrounding the pulleys B and C. While an endless member is shown, it will be understood that gears could be employed.

A pair of spaced flywheel members are shown at F and are fixed on the shaft E.

A cam housing or yoke G1 is shown as having vertical bar members in contact with diametrically opposed points on a cam H1. Similarly, a second cam housing or yoke G2 has vertical members in contact with a second cam H2.

A set of vertically positioned spaced positioning strips J form a harness or guide for the counterbalancing and saw-driving members below described.

A pair of vertically aligned spaced bar-like counterbalancing members L1, L2 are secured to the upper and lower end portions of the members G2. A second pair of counter-balancing weight members M1, M2 are vertically spaced and vertically aligned with the members L1, L2 and are secured respectively to the upper and lower end portions of the vertical yoke members G1.

A saw blade T may be secured, as indicated at P, to forwardly extending portions of the balancing rods L1, L2. A set of ball-bearing members is indicated at O. The letters TT indicate a shim for use when desired in connection with the cam yokes described above.

The mechanism above described may be enclosed conveniently in a cage or housing V.

Referring now to FIGURE 5, I illustrate a housing VV upon which a handle member 10 may be fixed, the handle 10 having manually grippable portions 11, 12. A laterally disposed handle element 13 may be fixed to the housing VV substantially in alignment with the motor A extending laterally from the housing VV. Secured to a forward portion of the housing VV as at 15 is a sheath member 16 as shown in FIGURE 5b. The sheath 16 has a pair of spaced side walls enclosing an upper portion of a saw blade T and extending the length of the saw blade T, the sheath 16 thus serving as a stabilizing guide for the blade T.

Figure 10:
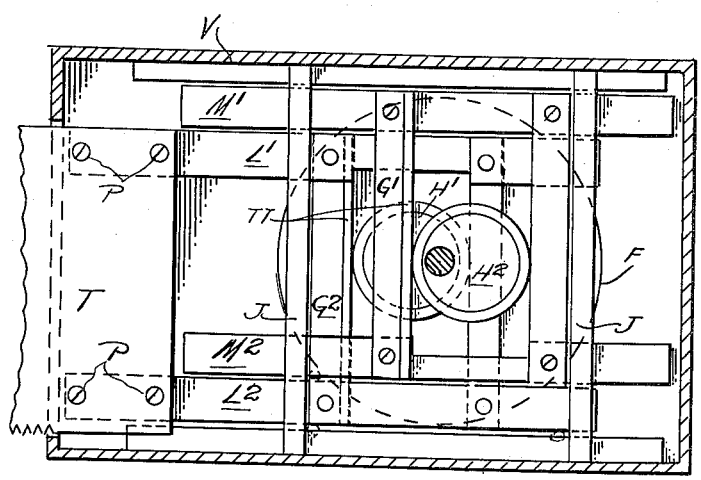
FIGURE 10 is a side view of a variant form of drive mechanism of my invention.

Referring now to the structure illustrated in FIGURE 10, it may be seen that the elements illustrated therein are substantially identical with those shown in FIGURES 1–4. In the device of FIGURE 10, however, the members M1, M2 and L1, L2 are alternately positioned in a vertical plane in alignment with the saw blade T.

Referring now to the device of my invention illustrated in FIGURES 6–9, the letters and numerals employed to designate parts identical with those described above are repeated for convenience. The structure illustrated in FIGURES 6–9, however, comprises a mechanism operable continuously in an oil bath. Accordingly, the housing V of FIGURE 6 is sealed against the escape of oil or lubricant therefrom. An aperture 20 in the housing VO is provided for reciprocal movement therein of a blade supporting bar or member 21, it being understood that an appropriate oil seal is provided for association with the aperture 20 and member 21.

Figure 9:
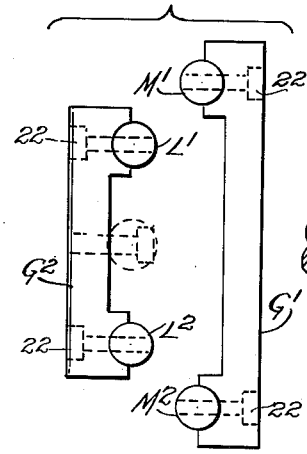
FIGURE 9 is a detail view of other portions of the structure illustrated in FIGURE 6.
Figure 8:
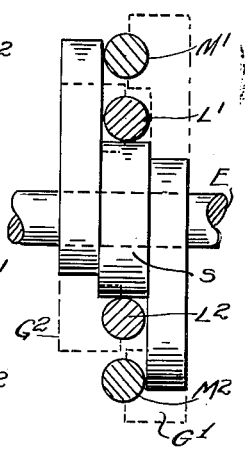
FIGURE 8 is a detail view of portions of the structure illustrated in FIGURE 6.

As best seen in FIGURES 8 and 9, the members L1, L2, M1, M2 are shown as cylindrical or rod-like. These elements, therefore, in FIGURES 8 and 9, are designated as RL1, RL2, RM1, RM2. As best seen in FIGURE 9 these rod-like balancing or stabilizing members may be secured to the yokes G1, G2 by any suitable securing means such as the bolts 22. A cam spacer element or member S is provided in the device of FIGURES 6-9 and is positioned between the cams H1, H2 as shown. As best seen in FIGURE 6a, the rods RL1, RL2, RM1, RM2 are mounted for reciprocal motion or movement in appropriate bearing members 23. The bearings 23 each have a pair of spaced annular flanges 23a serving to receive the harness or positioning strips J which, as illustrated in FIGURE 6, have been somewhat reduced in width to accommodate the bearings 23, it being understood that the relative size of the members J may be varied without departing from the nature and scope of my invention.

A supply of oil or lubricant 25 is contained within the housing VO, the bottom portion 26 of which serves as an oil reservoir.

Whereas I have described and illustrated a practical and operative device, nevertheless, many changes may be made in the size, shape, number and disposition of parts without departing from the spirit of my invention. I therefore wish my description and drawings to be taken as, in a broad sense, illustrative or diagrammatic, rather than as limiting me to my precise showing.

I claim:

1. In a reciprocating drive mechanism, an eccentric cam and means for rotating it, a yoke positioned adjacent said cam so as to be reciprocated thereby, a second eccentric cam mounted for rotation with said first cam, a yoke positioned adjacent said second cam so as to be reciprocated thereby, a counterbalance secured to each of said yokes, said cams and said yokes reciprocating said counterbalances in a single plane and a housing containing and supporting said first and second cams, said yokes and said counterbalances, said housing serving also as guide means for said yokes, said cams and yokes being positioned to cause movement of their respective counterbalances in opposite directions whereby the counterbalance secured to each of said yokes serves as a counterbalance to the cam and yoke combination associated with the other counterbalance.

2. In a reciprocating tool device, a housing, a shaft mounted in said housing, means for rotating said shaft, a pair of eccentric cams mounted on said shaft for rotation therewith, a yoke positioned adjacent each of said cams so as to be reciprocated thereby, a counterbalance member secured to each of said yokes, said cams and yokes being positioned to cause movement of their respective counterbalances in opposite directions whereby the counterbalance secured to each of said yokes serves as a counterbalance to the cam and yoke combination associated with the other counterbalance, said counterbalance members lying in the same plane, a reciprocating tool element secured to one of said counterbalance members whereby said tool element is reciprocated in the plane of said counterbalance members.

3. In a reciprocating tool mechanism, a housing, a shaft rotatably mounted in said housing, means for rotating said shaft, a pair of fly wheels spaced within said housing and mounted for rotation with said shaft, a pair of eccentric cams mounted within said housing for rotation with said shaft, a yoke positioned adjacent each of said cams so as to be reciprocated thereby, a counterbalance member secured to each of said yokes, said cams and yokes being positioned to cause movement of their respective counterbalances in opposite directions whereby the counterbalance secured to each of said yokes serves as a counterbalance to the cam and yoke combination associated with the other counterbalance, said counterbalance members being positioned in the same plane, said cams and said yokes adapted to reciprocate said counterbalance members in said plane.

4. The structure of claim 3 further characterized by a reciprocating tool element secured to one of said counterbalance members and adapted to be reciprocated thereby in said plane.

5. The structure of claim 4 wherein said reciprocating tool member is a saw.

6. In a reciprocating tool device, a housing, a shaft mounted in said housing, means for rotating said shaft, a pair of eccentric cams mounted on said shaft for rotation therewith, a yoke positioned adjacent each of said cams so as to be reciprocated thereby, a pair of counterbalance members secured to each of said yokes, said cams and yokes being positioned to cause movement of their respective counterbalances in opposite directions whereby the counterbalance secured to each of said yokes serves as a counterbalance to the cam and yoke combination associated with the other counterbalance, all of said counterbalance members lying in the same plane, and a reciprocating tool element secured to one pair of said counterbalance members so as to be reciprocated thereby in said plane.

References Cited in the file of this patent

UNITED STATES PATENTS

| | | |
|---|---|---|
| 496,874 | Hallsey | May 9, 1893 |
| 1,306,419 | Evensen | June 10, 1919 |
| 1,643,721 | Meyer | Sept. 27, 1927 |
| 1,785,736 | Hess | Dec. 23, 1930 |
| 1,838,125 | Wirtz | Dec. 29, 1931 |
| 1,934,186 | Gilstrap et al. | Nov. 7, 1933 |
| 2,224,867 | Hechler | Dec. 17, 1940 |
| 2,345,383 | Curtis | Mar. 28, 1944 |
| 2,355,011 | Putnam | Aug. 1, 1944 |
| 2,501,631 | Oschwald | Mar. 21, 1950 |
| 2,595,482 | Palumbo | May 6, 1952 |
| 2,622,940 | Johnson | Dec. 23, 1952 |
| 2,704,941 | Holford | Mar. 29, 1955 |

FOREIGN PATENTS

| | | |
|---|---|---|
| 199,020 | Austria | Feb. 13, 1957 |